United States Patent [19]

Giles, Jr.

[11] 4,368,620

[45] Jan. 18, 1983

[54] WINDMILLS FOR RAMJET ENGINE

[76] Inventor: Harry L. Giles, Jr., 3630 - 122nd Pl., NE., Bellevue, Wash. 98005

[21] Appl. No.: 161,245

[22] Filed: Jun. 20, 1980

[51] Int. Cl.³ .............................................. F02K 7/18
[52] U.S. Cl. .................................... 60/270 S; 60/245
[58] Field of Search ........... 60/270 R, 270 S, 39.18 C, 60/269, 245, 39.18 A

[56] References Cited

U.S. PATENT DOCUMENTS

| 2,610,464 | 9/1952 | Knoll | 60/270 R |
| 2,729,061 | 1/1956 | Grafinger et al. | 60/39.18 C |
| 3,105,661 | 10/1963 | Ferri | 60/270 R |
| 3,719,428 | 3/1973 | Dettmering | 60/39.18 C |
| 4,275,857 | 6/1981 | Bergsten | 60/39.18 C |

FOREIGN PATENT DOCUMENTS 827663 2/1960 United Kingdom ............. 60/270 R

Primary Examiner—Robert E. Garrett
Attorney, Agent, or Firm—Thomas H. Murray

[57] ABSTRACT

A solid fueled ramjet engine comprising solid fuel within a combustion chamber in the form of a hollow cylinder, and a windmill at the entrance to the hollow cylinder for promoting better distribution of the air, better mixing of the air and combustion gases, and more complete combustion of the solid fuel. The windmill is turned by the incoming airflow and can rotate a generator to provide a source of electrical power for the aircraft on which the engine is used.

7 Claims, 8 Drawing Figures

WINDMILLS FOR RAMJET ENGINE

BACKGROUND OF THE INVENTION

Although not limited thereto, the present invention is particularly adapted for use with integral rocket-ramjet engines for aircraft (e.g., missiles). Such engines comprise a combustion chamber lined with concentric cylinders of a solid ramjet fuel and a solid rocket propellant. Initially, the rocket propellant is ignited and burned without any air passing into the combustion chamber. In this phase of operation, the engine acts as a rocket. After the rocket propellant is burned, air is permitted to flow through the interior of the solid ramjet fuel cylinder which then burns in the presence of air to effect ramjet action.

A persistent problem with ramjet engines of this type is circumferential distortion and uneven burning of the inside wall of the fuel cylinder during ramjet operation. In this respect, the combustion process in a solid fuel ramjet has fuel "rich" and fuel "lean" zones which restrict the attainment of high combustion efficiency. In the past, attempts have been made to improve combustion efficiency with the use of orifice plates and vortex generators at the combustor entrance to induce turbulence; but these devices achieve only marginal improvement and influence only a fraction of the total airflow through the combustor. An air-pass system which promotes total flow mixing in an aft combustor has markedly improved combustion efficiency, but such systems add significant complexity and weight.

SUMMARY OF THE INVENTION

In accordance with the present invention, combustion efficiency is materially improved in a solid fuel ramjet engine, and circumferential distortion of the inner periphery of a tubular solid fuel element is minimized, with the use of a windmill disposed at the inlet to the ramjet combustion chamber. The windmill provides swirl and vorticity to a solid fueled ramjet combustor to provide better mixing, more uniform burning, and higher combustion efficiencies. At the same time, the rotating windmill can be used to power an electrical generator carried on a missile or the like.

Specifically, there is provided a ramjet engine equipped with a combustion chamber having an air inlet and an air exhaust outlet. Solid fuel is carried within the combustion chamber and has a central opening therein through which gases can flow from the inlet to the exhaust outlet. A rotatable windmill is disposed at the air inlet to create swirl and vorticity of the entering air to promote better mixing of the gases in the central opening and improved combustion efficiency.

The above and other objects and features of the invention will become apparent from the following detailed description taken in connection with the accompanying drawings which form a part of this specification, and in which.

Figure 1:
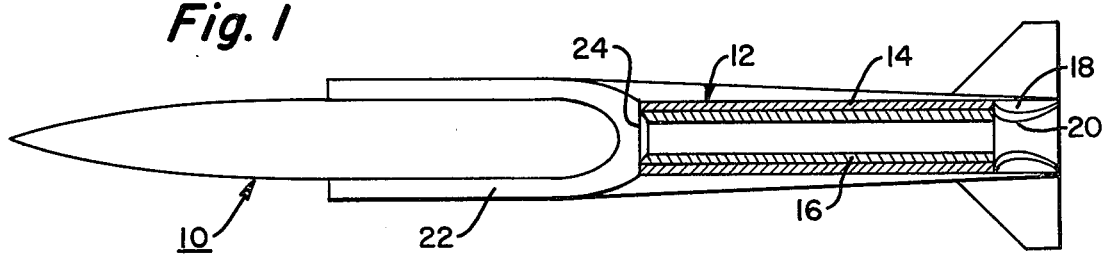
FIG. 1 is an illustration of a typical integral rocket/ramjet engine.

With reference now to the drawings, and particularly to FIG. 1, a missile is shown incorporating a conventional integral rocket/ramjet engine. The missile is identified generally by the reference numeral 10 and carries at its aft portion a generally cylindrical combustion chamber 12. Fitted into the combustion chamber 12 is a first tubular solid ramjet fuel element 14; and carried within the fuel element 14 is a solid tubular boost propellant fuel element 16. At the trailing end of the combustion chamber 12 is a ram jet nozzle 18 and an inner, ejectable boost nozzle 20 of smaller diameter. At the midportion of the missile 10 are two air inlets 22 which direct air into an air injector orifice 24 at the forward end of the combustion chamber 12.

In the operation of the rocket/ramjet engine, the solid boost propellant fuel element 16 is initially ignited with no air flowing through the air injector orifice 24. That is, during initial operation a cover, not shown, is provided for preventing air from entering the inlets 22. The fuel element 16 burns, thereby producing a rocket thrust. Upon rocket boost burnout, the inner boost nozzle 20 is ejected, leaving the larger nozzle throat 18 required for ramjet flow. After ejection of the boost nozzle 20, air is permitted to flow through the inlets 22, orifice 24 and the central opening formed in the fuel element 14. The engine now acts as a ramjet engine.

Integral rocket/ramjets, by their nature, have problems with delivered airflow distortions, poor air/fuel mixing, low combustion efficiencies and localized hot spots at the inner periphery of the fuel element 14 during ramjet operation. Injection plates at various grids and aerogrids have been found to improve the quality of the flow in combustion in solid fueled ramjets. However, experiments have demonstrated the need for a recirculation zone to promote efficient solid fuel combustion.

Figure 2:
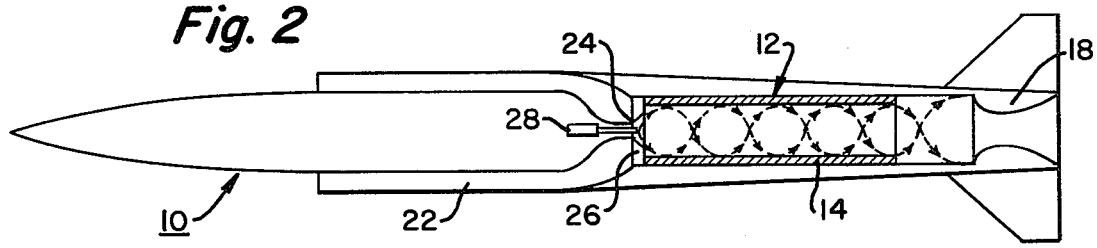
FIG. 2 is an illustration of a ramjet engine employing the principles of the present invention.

In the present invention, shown in FIG. 2, improved air circulation is provided with the use of a windmill located within or closely adjacent the air injector orifice 24. Elements in FIG. 2 which correspond to those of FIG. 1 are identified by like reference numerals. The windmill in FIG. 2 is identified by the reference numeral 26 and produces a vortical flow of air through the interior of the solid fuel element 14, thereby improving mixing and combustion efficiency. As shown, the windmill 26 can be connected to an electrical generator 28 to supply electrical power to the missile 10.

Figure 3A:
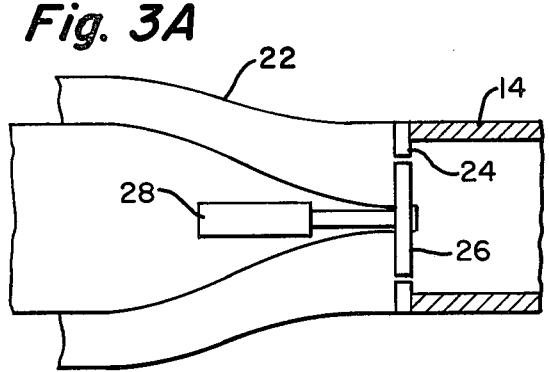
FIGS. 3A–3D illustrate various embodiments which the windmill of the invention may take.
Figure 3B:
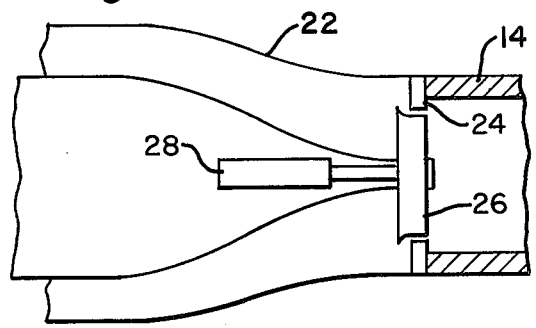
Figure 3C:
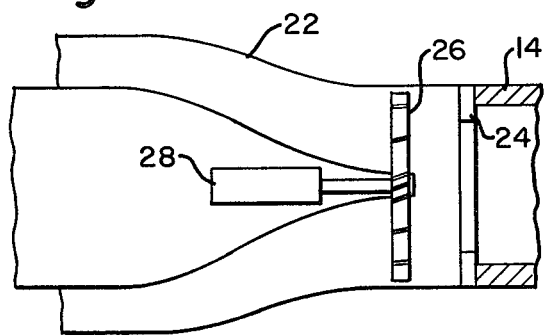
Figure 3D:
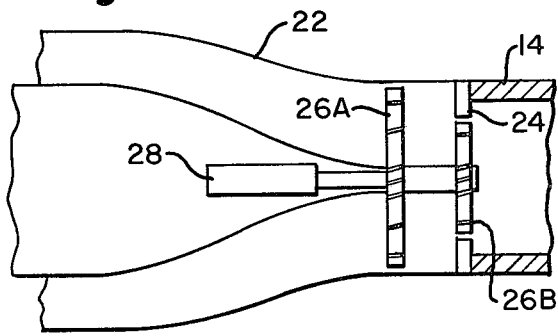
Figure 4:
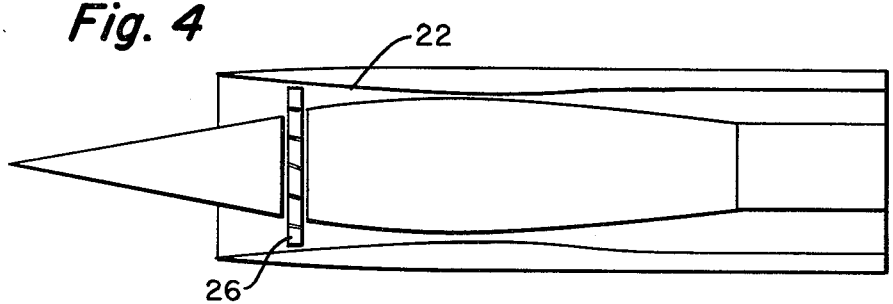
FIG. 4 is an illustration of an embodiment of the invention wherein the windmill is located in the supersonic portion of the air inlet.

Various embodiments of the windmill construction are shown in FIGS. 3A–3D. The windmill can be rimmed or shrouded, or the tips can be free. The windmill can be employed at the combustor entrance or upstream of the air injector. Two stages are conceivable either operating together or separately. In FIG. 3A, for example, the windmill 26 is disposed directly within the air injector orifice 24 and has blades with free ends. In FIG. 3B, the windmill is again disposed within the air injector orifice 24, but is shrouded. In FIG. 3C, the windmill 26 is disposed upstream of the orifice 24 and again has free ends. In FIG. 3D, a two-stage windmill is shown comprising an upstream windmill 26A and a windmill 26B disposed within the orifice 24. The two windmill elements 26A and 26B can rotate together as a unit; or windmill 26B, for example, can rotate at a speed different from that of windmill 26A. In FIG. 4, still another embodiment of the invention is shown wherein the windmill 26 is located at the forward end of the air intakes 22.

Figure 5:
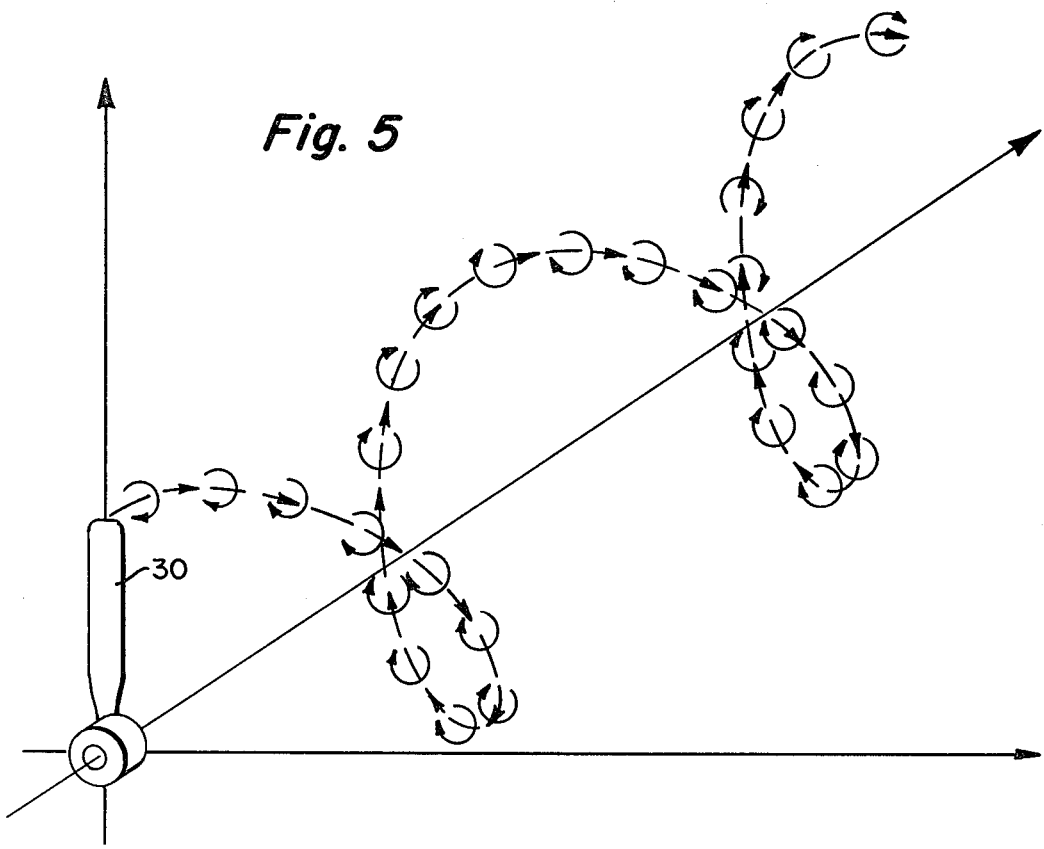
FIG. 5 schematically illustrates the vortex action achieved with the windmill of the invention.

FIG. 5 illustrates the helical vortex filament from a windmill blade tip identified by the reference numeral 30. It will be noted that a swirling vortical air movement is achieved along the inner periphery of the ramjet fuel element 14. The exact effect produced can be varied by varying the pitch and other design parameters of the individual blades 30 used on the windmill.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A ramjet engine comprising a combustion chamber having an air inlet and an exhaust outlet, solid fuel carried within said combustion chamber and having a central opening therein through which gases can flow from said inlet to said exhaust outlet, and a rotatable windmill disposed at said inlet to create swirl and vorticity of the entering air and promote better mixing of gases in said central opening and improved combustion efficiency.

2. The ramjet engine of claim 1 including an electrical generator connected to said rotatable windmill and powered thereby.

3. The ramjet engine of claim 1 wherein said windmill has a plurality of circumferentially-spaced blades, the blades having free ends.

4. The ramjet engine of claim 1 wherein said windmill has a plurality of circumferentially-spaced blades, and a shroud surrounding said blades.

5. The ramjet engine of claim 1 wherein said windmill is disposed directly within said inlet.

6. The ramjet engine of claim 1 wherein said windmill is disposed upstream of said inlet.

7. The ramjet engine of claim 1 wherein there are two windmills, one of which is disposed directly within said inlet and the other of which is upstream of the inlet.

* * * * *